Dec. 22, 1964 — M. E. LEE — 3,161,982
FISHING BOBBER
Filed Dec. 27, 1960

INVENTOR.
MATTHEW E. LEE
BY
Eugene C. Knoblock
ATTORNEY

United States Patent Office 3,161,982
Patented Dec. 22, 1964

3,161,982
FISHING BOBBER
Matthew E. Lee, Land-O-Lakes, Wis.
Filed Dec. 27, 1960, Ser. No. 78,725
4 Claims. (Cl. 43—43.1)

This invention relates to improvements in fishing bobbers.

The primary object of this invention is to provide a novel, simple and inexpensive fishing bobber which is attractive in appearance and which is particularly well suited for use in ice fishing.

A further object is to provide a fishing bobber for ice fishing characterized by a body formed of resilient synthetic resin sponge material characterized by closed cells which provides buoyancy and accommodates flexing under pressure as a means to remove ice encrusted thereon.

A further object is to provide a fishing bobber formed of a plurality of pieces of closed cell sponge material of different colors cemented together to produce a body of desired shape and size and of permanent buoyant character and coloration.

Other objects will be apparent from the following specification.

The use of fishing bobbers in ice fishing is attended with progressive building up of an ice coating on the bobber. As the coating of ice on a bobber increases, the bobber increases in size and weight and loses its sensitivity as an indicator when a fish strikes the fishing tackle which carries the bobber. Consequently, it is necessary to remove the ice periodically during fishing in order to retain the desired proper functioning of the bobber. The removal of ice from a bobber is difficult to accomplish without injuring the bobber, especially in view of the weather conditions prevailing during ice fishing. Thus, if any effort is made to use a tool, such as a knife, there is a serious danger that the bobber will be cut or otherwise injured during removal of ice therefrom. Some fishermen avoid the use of tools by employing their teeth to remove the ice, but this is unsanitary and likewise is subject to possible injury to the bobber as a result of which paint or other color coating of the bobber may be injured or damaged and the desired attractive appearance of the bobber may be lost. The present bobber has been designed to overcome these difficulties by constructing the same in a manner to enable ice coatings to be removed therefrom without the use of tools quickly and expeditiously and without danger of altering the appearance or coloration of the bobber.

The bobber is of the type which is mounted upon a fishing line 10, to which one or more fish hooks 12 are connected and to which a sinker or weight 14 may be connected. The bobber 16 is secured at a selected length upon the line 10 and has sufficient buoyancy to cause the fish hooks 12 and the sinker 14 to be immersed in water to selected depth.

Figure 7:
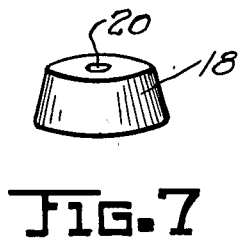
FIG. 7 is a perspective view of a part utilized in constructing the bobber.

The bobber 16 comprises a body formed of a plurality of sections or pieces 18 of flexible resilient compressible buoyant material. I prefer to employ a synthetic resin sponge material of the closed cell or unicellular type well known in the art. Material of this character possesses the desired properties of buoyancy, resilience and flexibility and also is available in different colors to that the buoyant pieces 18 have permanent coloration. Each piece 18 of buoyant material has a passage 20 extending therethrough and preferably will be formed of sheet material of selected thickness, having substantially parallel opposed faces. The pieces 18 will preferably be of desired configuration and may be of tapered frusto conical configuration, as illustrated in FIG. 7. This shape is not essential, however, and the indvidual pieces of buoyant material 18 need not be tapered nor need they be round. Also, where formed of frusto conical shape, the individual pieces may be of different sizes.

Figures 1, 2, 3:
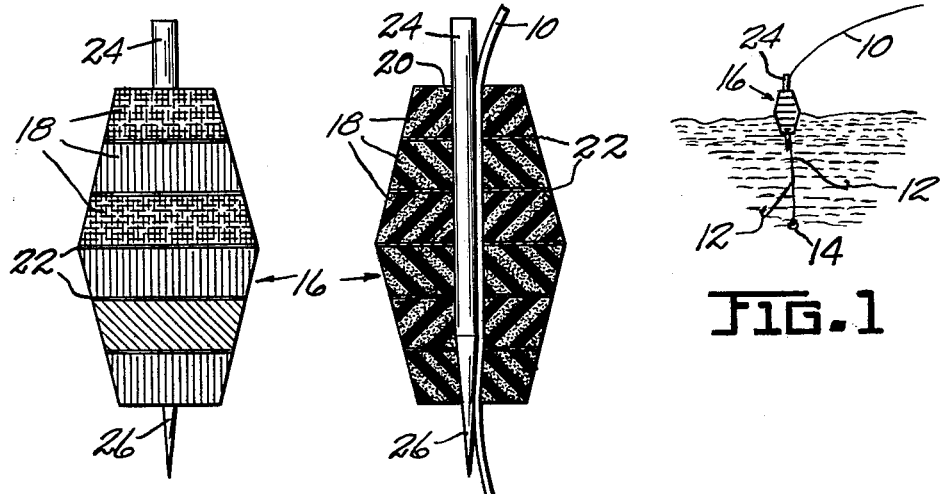
FIG. 1 is a view of a fishing rig utilizing my improved bobber.
FIG. 2 is a view of the bobber in side elevation.
FIG. 3 is a longitudinal axial sectional view of the bobber.
Figures 4, 5, 6:
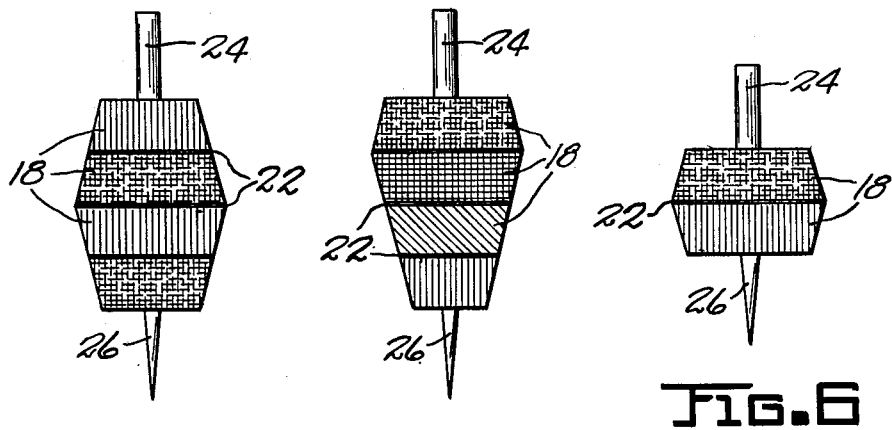
FIG. 4 is a side view of a modified form of the bobber.
FIG. 5 is a side view of another modified form of the bobber.
FIG. 6 is a side view of still another modified form of the bobber.

Any selected number of pieces 18 of buoyant material of selected sizes may be arranged in superimposed position with their apertures 20 aligned and in selected color combinations or arrangements and are secured together by layers 22 of cement. The resulting body may be of any of a large number of sizes, shapes and color combinations. The body is unitary and has an aperture extending therethrough to receive a stick or wedge member 24 preferably of the type illustrated having a tapered end 26 facilitating insertion into the aligned holes 20 in cases where the cross-sectional dimension of the stick 24 is greater than the cross-sectional size of the hole 20. This arrangement facilitates the anchorage of the bobber upon the line at any selected point, in the manner illustrated in FIG. 3. Specifically, the line 10 is passed through the opening in the body while the stick 24 is removed from the hole and, after the body is positioned in desired location upon the line, the stick is inserted into the body and serves as a wedge to anchor or position the bobber body upon the line at the selected location.

The unicellular character of the parts 18 forming the body imparts to the finished bobber body buoyancy adequate to serve the intended function of a fishing bobber, namely, to expose the bobber as it floats but permitting immersion of the bobber incident to a tug upon the line imparted by a fish which is caught upon a hook attached to the line. The colors of the bobber are preferably bright and are selected to render the bobber readily visible even in dim light, as within a windbreak or enclosure set up around a hole in the ice through which fishing is conducted. When ice has been formed upon the body to such an extent that the bobber no longer functions properly but becomes sluggish and excessively large, the ice can be removed easily and quickly by simply pressing upon the flexible resilient body material sufficiently to break the ice crust. If necessary, the user can step upon the body of the bobber for the purpose of breaking an ice crust in cases where the crust has reached such a thickness that it resists breaking by hand pressure. Pressure can, of course, be applied in such a direction as not to injure the stick, for example, by pressing the body in a direction transverse of the length of the stick. Such squeezing of the body rapidly disengages the ice therefrom and restores the bobber to normal size and to normal coloration. Thus, without requiring the use of special tools and without requiring any substantial amount of time or inconvenience, the bobber can be freed of ice without injury thereto, inasmuch as the resilient character of the body permits it to take its normal shape as soon as the crushing compression thereon is released.

The use of the unicellular material which can be permanently colored is important from the standpoint of insuring that the color of the bobber will remain constant even in cases where some injury resulting in nicking or notching of the body might occur.

For the purposes of illustration, the drawing has been lined in FIGS. 2, 4, 5 and 6 to designate color. These color designations are illustrative only and are intended to represent some of the color combinations and arrangements which are possible by simply selecting and arranging, as desired, body-forming components 18 of standard sizes and shapes.

Vinyl type resins, such as polyvinyl chloride, natural rubber and synthetic rubber, such as "Neoprene" and "Buna N," have been found particularly well suited for use in bobbers when processed to provide the desired unicellular internal structure and cut to form the body-forming parts 18, that is to provide uniformly dispersed non-communicating individual voids. Examples of materials on the market which are suitable for the intended use include a material known as "Ensolite" manufactured by the United States Rubber Company, and a material known as "Rubatex" manufactured by Great American Industries, Inc.

While the preferred embodiments of the invention have been illustrated and described, it will be understood that changes in construction may be made within the scope of the appended claims without departing from the spirit of the invention.

I claim:

1. A fishing bobber having an opening therethrough to constrictively receive a line and a wedging member, said body being buoyant and formed of a plurality of apertured resilient members cemented together at apertured surfaces thereof with their apertures substantially in register, whereby said body may be compressed to crush ice thereon without breakage thereof, said resilient members being of different colors and characterized by closed voids throughout to render them non-absorbent.

2. A fishing bobber having an opening therethrough to receive a line and a wedging member, said body being buoyant and formed of a plurality of resilient parts of compressible unicellular synthetic resin, each having opposed surfaces and a substantially central aperture extending therethrough between said surfaces, said parts being cemented at said opposed surfaces with said apertures in register for constrictive frictional engagement with said line and wedging member, said body being flexible whereby it may be compressed without breaking so as to crush ice thereon.

3. A fishing bobber having an opening therethrough to receive a line and a wedging member, said body being buoyant and formed of a plurality of resilient parts each having opposed surfaces and a substantially central aperture extending therethrough between said surfaces, said parts being cemented at said opposed surfaces with said apertures in register for constrictive frictional engagement with said line and wedging member, said parts being formed of compressible material having non-communicating voids throughout, whereby ice thereon may be crushed by compressing said body without breakage of said body, some of said parts being of different dimensions than adjacent parts.

4. A fishing bobber having an opening therethrough to receive a line and a wedging member, said body being buoyant and formed of a plurality of resilient parts each having opposed surfaces and a substantially central aperture extending therethrough between said surfaces, said parts being cemented at said opposed surfaces with said apertures in register for constrictive frictional engagement with said line and wedging member, said parts being formed of compressible material having non-communicating voids throughout, said parts being of frusto conical shape and different sizes, said cemented body being compressible without breakage to crush ice thereon.

References Cited in the file of this patent

UNITED STATES PATENTS

| | | |
|---|---|---|
| 290,154 | Vidal | Dec. 11, 1883 |
| 2,137,341 | Hingle | Nov. 22, 1938 |
| 2,158,086 | Roberts et al. | May 16, 1939 |
| 2,559,084 | McGlade | July 3, 1951 |
| 2,718,033 | Burke | Sept. 20, 1955 |
| 2,784,518 | Boyer | Mar. 12, 1957 |
| 2,897,625 | Spitzli et al. | Aug. 4, 1959 |
| 2,938,293 | Richardson | May 31, 1960 |